United States Patent
Fraas

(10) Patent No.: US 11,277,090 B1
(45) Date of Patent: Mar. 15, 2022

(54) MULTI FUEL THERMOPHOTOVOLTAIC GENERATOR INCORPORATING AN OMEGA RECUPERATOR

(71) Applicant: JX Crystals Inc., Issaquah, WA (US)

(72) Inventor: Lewis M. Fraas, Issaquah, WA (US)

(73) Assignee: JX Crystals Inc., Issaquah, WA (US)

( * ) Notice: Subject to any disclaimer, the term of this patent is extended or adjusted under 35 U.S.C. 154(b) by 173 days.

(21) Appl. No.: 16/228,838

(22) Filed: Dec. 21, 2018

Related U.S. Application Data

(60) Provisional application No. 62/609,437, filed on Dec. 22, 2017.

(51) Int. Cl.
| | |
|---|---|
| *H02S 10/30* | (2014.01) |
| *F23L 15/04* | (2006.01) |
| *F23D 11/44* | (2006.01) |
| *H02S 40/42* | (2014.01) |
| *H02S 10/40* | (2014.01) |

(52) U.S. Cl.
CPC .............. *H02S 10/30* (2014.12); *F23D 11/44* (2013.01); *F23L 15/04* (2013.01); *H02S 10/40* (2014.12); *H02S 40/425* (2014.12); *F23N 2237/12* (2020.01); *F23N 2237/14* (2020.01); *F23N 2241/00* (2020.01)

(58) Field of Classification Search
CPC ........ H02S 10/30; H02S 40/425; H02S 10/40; Y02E 10/60; F23M 2900/13004; F23M 2900/13003; F23D 11/44; F23L 15/04; F23N 2241/00; F23N 2237/14; F23N 2237/12

See application file for complete search history.

(56) References Cited

U.S. PATENT DOCUMENTS

| | | | | |
|---|---|---|---|---|
| 3,685,972 A | * | 8/1972 | De Palma et al. ...... | F16C 11/06 422/179 |
| 4,045,159 A | * | 8/1977 | Nishi .................... | F23D 11/005 431/328 |
| 4,230,443 A | * | 10/1980 | Berg ...................... | F02M 27/02 431/328 |

(Continued)

FOREIGN PATENT DOCUMENTS

JP 2005011937 A * 1/2005

OTHER PUBLICATIONS

L.M. Fraas et al., Scale Up Designs for Hand-Held Light-Weight TPV DC Power Supply https://www.researchgate.net/.../318351588_Scale_Up_Designs_for_Hand-Held Light-...Conference Paper • Jun. 2017. Conference: IEEE PVSC 44, at Washington DC.

*Primary Examiner* — Jorge A Pereiro
(74) *Attorney, Agent, or Firm* — James Creighton Wray

(57) ABSTRACT

A thermophotovoltaic generator uses conveniently available liquid hydrocarbon fuels. The fuels are controllably heated and vaporized before ignition to avoid residue and deposits as a result of liquid fuel being prematurely exposed to high temperatures of combustion causing unwanted breakdowns, producing power robbing residues and deposits. Heating fuel and air to right temperatures for ignition is accomplished by drawing combustion air over an exhaust chamber, through a regenerator and through a passage surrounding an IR filter. A separate cooling fan drives air through photovoltaic cell array fins over the recuperator and the exhaust in counterflow to the combustion air.

15 Claims, 8 Drawing Sheets

(56) References Cited

U.S. PATENT DOCUMENTS

| | | | | |
|---|---|---|---|---|
| 4,421,476 A * | 12/1983 | Gulden | ............... | F23D 14/18 431/243 |
| 4,528,417 A * | 7/1985 | Chubb | ............... | H02S 10/30 136/253 |
| 4,707,560 A * | 11/1987 | Hottel | ............... | H02S 99/00 136/253 |
| 5,312,521 A * | 5/1994 | Fraas | ............... | H01L 31/0547 136/246 |
| 5,383,976 A * | 1/1995 | Fraas | ............... | H02S 10/30 136/246 |
| 5,439,532 A * | 8/1995 | Fraas | ............... | H02S 10/30 136/253 |
| 5,551,992 A * | 9/1996 | Fraas | ............... | H02S 10/30 136/253 |
| 5,647,916 A * | 7/1997 | Guazzoni | ............... | H02S 10/30 136/253 |
| 5,932,885 A * | 8/1999 | DeBellis | ............... | F28D 9/0025 250/493.1 |
| 6,204,442 B1 * | 3/2001 | Laqua | ............... | H02S 10/30 136/253 |
| 6,218,607 B1 * | 4/2001 | Mulligan | ............... | H02S 10/30 136/253 |
| 6,235,983 B1 * | 5/2001 | Becker | ............... | H02S 10/30 136/253 |
| 6,284,969 B1 * | 9/2001 | Fraas | ............... | H02S 10/30 136/253 |
| 6,461,148 B1 * | 10/2002 | Scotto | ............... | F23D 11/24 126/91 A |
| 8,581,090 B1 * | 11/2013 | Fraas | ............... | H02S 10/30 136/248 |
| 2002/0153035 A1 * | 10/2002 | Nakayama | ............... | F23D 14/125 136/206 |
| 2004/0244830 A1 * | 12/2004 | Hokoi | ............... | H02S 10/30 136/253 |
| 2011/0284059 A1 * | 11/2011 | Celanovic | ............... | H02S 10/30 136/253 |
| 2015/0207008 A1 * | 7/2015 | Holzner | ............... | F23M 20/00 136/253 |
| 2015/0207450 A1 * | 7/2015 | Holzner | ............... | F23M 20/00 136/253 |
| 2018/0159459 A1 * | 6/2018 | Mills | ............... | G21B 3/00 |

* cited by examiner

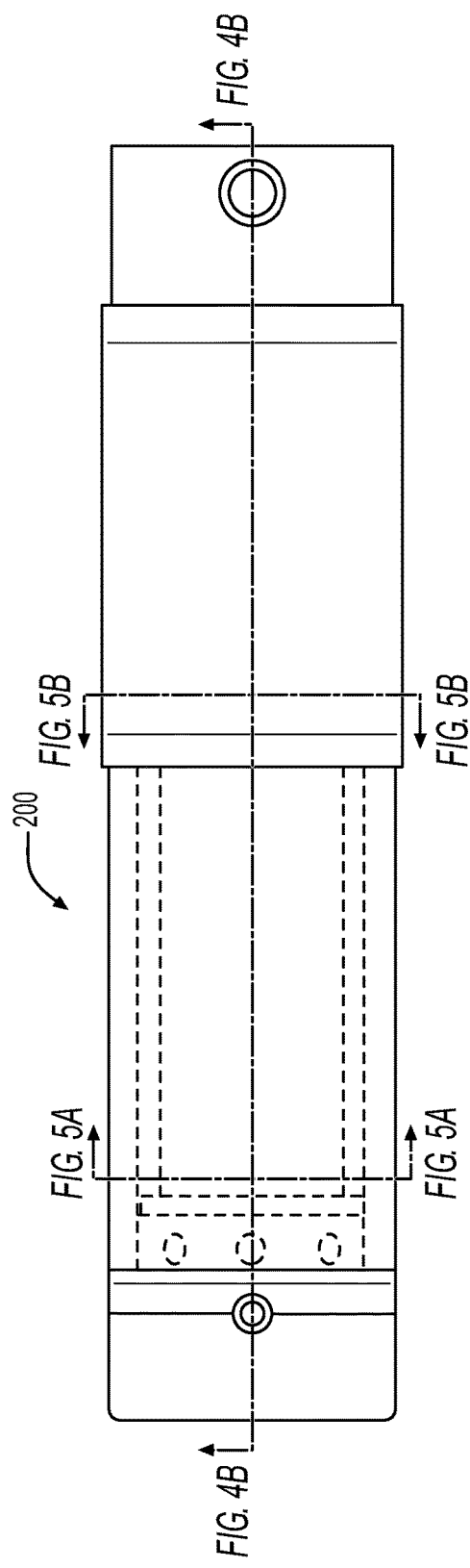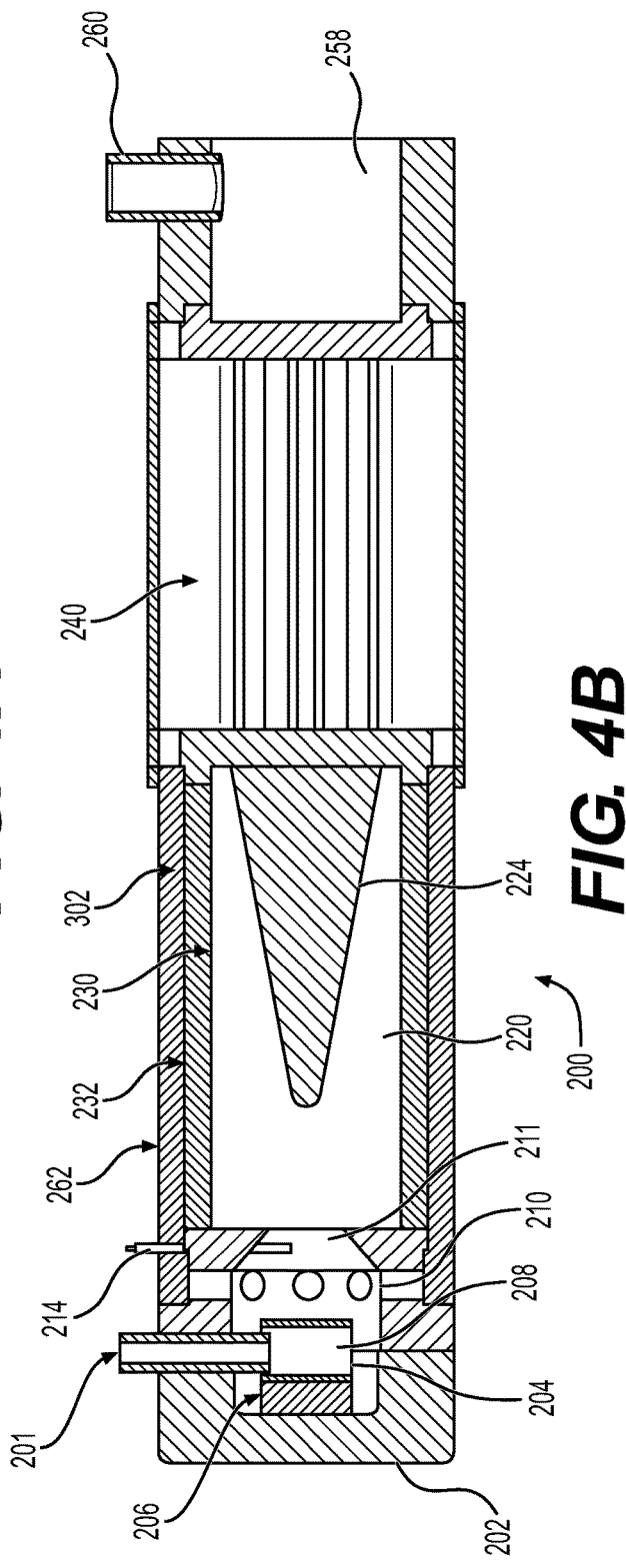
FIG. 4A
FIG. 4B

MULTI FUEL THERMOPHOTOVOLTAIC GENERATOR INCORPORATING AN OMEGA RECUPERATOR

This application claims the benefit of U.S. Provisional Application No. 62/609,437 filed Dec. 22, 2017, which is hereby incorporated by reference in its entirety as if fully set forth herein.

SUMMARY OF THE INVENTION

This invention stems from the need to provide portable electric generators in remote areas where kerosene may be available and where JP8 aircraft fuel may be available.

The new thermophotovoltaic generator uses available liquid hydrocarbon fuels. The fuels are heated and are controllably vaporized before ignition to avoid premature breakdown by flash vaporization in high temperatures of combustion. Residue and deposits are caused as a result of liquid fuel being prematurely exposed to high heats causing breakdowns of their chemical compositions. Heating fuel and air to right temperatures for ignition is accomplished by drawing combustion air over an exhaust chamber, through a regenerator and through a controlled passage around an IR filter. A separate cooling fan drives air through photovoltaic cell array fins over the recuperator and the exhaust in counterflow to the combustion air.

A portable fuel-powered thermophotovoltaic (TPV) generator has a fuel inlet, a heated air inlet and a mixing chamber connected to the fuel inlet and the heated air inlet. A combustion chamber follows the fuel inlet, the heated air inlet and the mixing chamber.

A continuing combustion chamber is connected to the combustion chamber.

A combustion product outlet is connected to the continuing combustion chamber, and a recuperator is connected to the combustion product outlet.

A combustion air supply is connected to the recuperator, and a heated air outlet is connected to the recuperator. An exhaust is connected to the recuperator to remove the combustion product.

An IR emitter surrounds the continuing combustion chamber. An IR filter is spaced outward from and surrounds the IR emitter. A window is spaced outward from and surrounds the IR filter. The heated combustion air further flows through a space between the IR filter and the window, which further heats the combustion air as it passes to the heated air inlet. A thermophotovoltaic array surrounds the window.

An exhaust chamber is connected between the recuperator and the exhaust.

A combustion air fan blows combustion air across the exhaust chamber and into and through a combustion air side of the recuperator.

A conic catalyst pillar is mounted in the continuing combustion chamber near the recuperator for directing IR toward the IR emitter and guiding exhaust gas into an exhaust side of the recuperator.

A fuel vaporizing chamber is connected between the fuel inlet and the mixing chamber. A heater is connected to the vaporizing chamber for vaporizing kerosene or JP8 fuel. An ignition chamber is connected between the mixing chamber and the combustion chamber, and an igniter is connected to the ignition chamber.

The recuperator is an omega recuperator having an omega element surrounding an open middle. The open middle and inner side of the omega element provide an air side of the omega recuperator. Outer sides of the omega element provide an exhaust side. An annular thermophotovoltaic cell array surrounds the window for generating electric current from the IR passing through the window. Heat transfer finds extend radially outward from the photovoltaic cell array.

A housing surrounds the fins and the photovoltaic generator. A cooling fan mounted in one end of the casing blows cooling air through the fins and around the thermophotovoltaic generator. A liquid hydrocarbon fuel tank is mounted above the housing.

The new invention provides a thermophotovoltaic generator and blows combustion air over an exhaust chamber and through a recuperator and through an annular space between a window and an IR filter into a mixing chamber. Liquid hydrocarbon fuel flows into a vaporizing chamber. The vaporizing chamber heats and vaporizes the fuel. Vaporized hydrocarbon fuel flows into the mixing chamber, The vaporized fuel and the heated air flow into an ignition chamber. An igniter ignites the mixed vaporized fuel and heated combustion air in an ignition chamber, and combustion occurs in the combustion chamber. Combustion continues in a continuing combustion chamber, heating and irradiating an IR emitter surrounding the continuing combustion chamber.

IR is filtered into a useful IR range, passing useful IR from the IR filter through a window to a photovoltaic cell array. The IR filter surrounds the window.

Electricity is generated in the photovoltaic array.

Passing the hot combusted and combusting hot air and fuel over a conic catalyst pillar directs heat and radiation to the IR emitter from the pillar.

Hot combustion product gas from the combustion chamber passes through the recuperator and the exhaust chamber and out through the exhaust.

Heating the combustion air from the combustion product gas occurs in an omega recuperator, separating the combustion air from the combustion product gas on opposite sides of an omega element in the omega recuperator.

A cooling fan mounted in a casing opposite the combustion air fan cools fins extending radially from a cylindrical thermophotovoltaic cell array.

These and further and other objects and features of the invention are apparent in the disclosure, which includes the above and ongoing written specification, with the claims and the drawings.

BRIEF DESCRIPTION OF THE DRAWINGS

FIGS. 4A and 4B show top and cross-sectional views of a burner emitter recuperator (BER) construction for use with multiple fuels, such as JP8, of the present invention.

DETAILED DESCRIPTION

Figure 1:
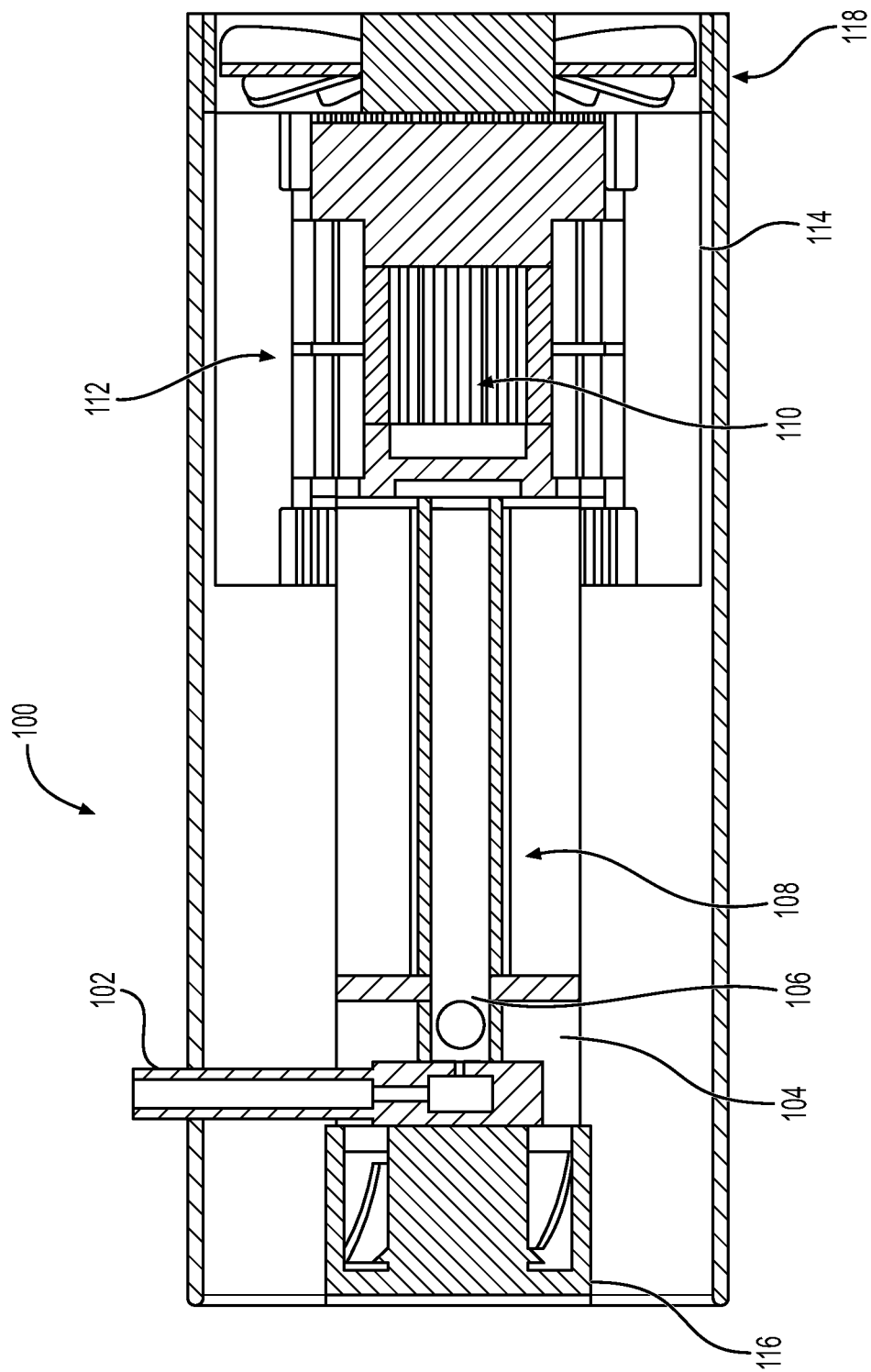
FIG. 1 is a cross-sectional view of the 2013 U.S. Pat. No. 8,581,090 by L. M. Fraas, cylindrical thermophotovoltaic (TPV) generator.
Figure 2A:
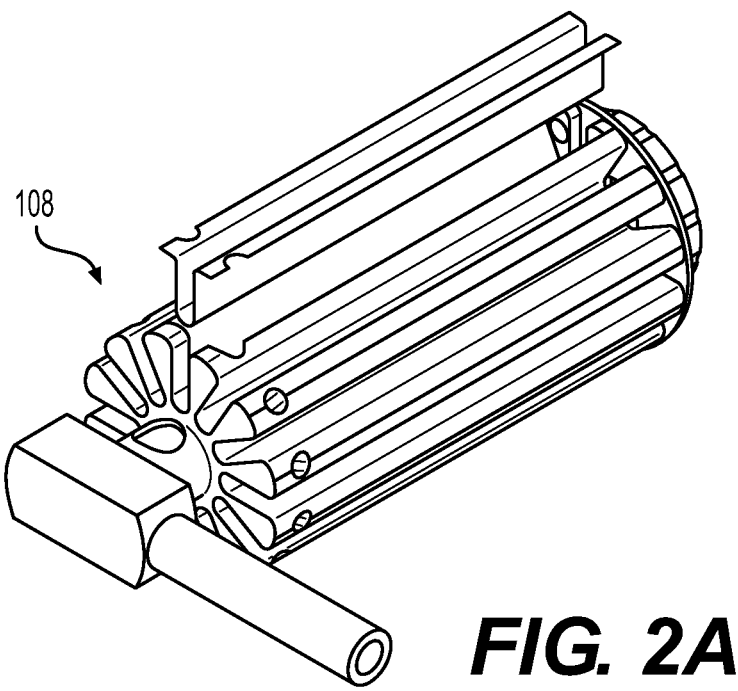
FIGS. 2A, 2B, 2C and 2D are details of the Omega recuperator described in that 2013 patent.
Figure 2B:
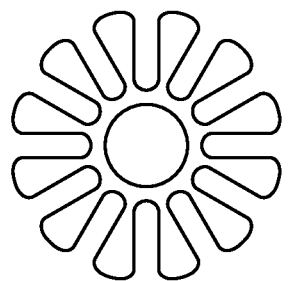
Figure 2C:
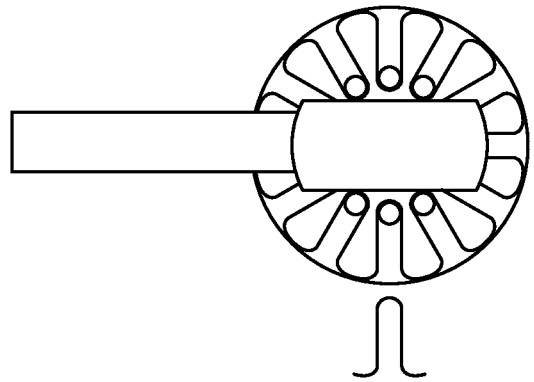
Figure 2D:
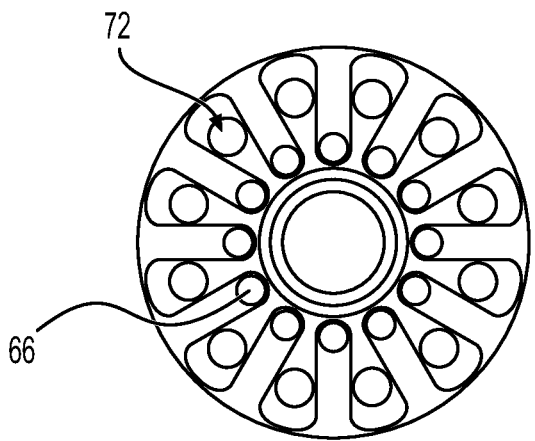

FIGS. 1, 2, and 3 show some of the elements described in the 2013 L. M. Fraas U.S. Pat. No. 8,581,090, which is hereby incorporated by reference in its entirety as if fully set forth herein. Some of the elements of the generator 100 shown in FIG. 1 are hydrocarbon fuel supply 102 and air supply 104 to a burner 106, an Omega recuperator 108, and an infrared (IR) emitter 110 surrounded by a photovoltaic (PV) converter array 112 with fins 114 provided for PV array cooling. A combustion air fan 116 and a cooling fan 118 are provided. FIGS. 2A-D show detail for the Omega recuperator 108 used in the invention described in Applicant's 2013 patent.

The TPV generator 100 shown in FIG. 1 is appropriate for operation with gaseous hydrocarbon fuels such as propane or butane, but difficulties can arise for liquid fuels such as kerosene or JP8 supplied through a fuel line that runs through the center of the recuperator as shown in FIGS. 1 and 2A-D. A liquid fuel can get overheated and vaporize prematurely or even can get overheated to the point where it begins to decompose and form tar or carbon deposits in the fuel line.

The new burner/emitter/recuperator (BER) 200 shown in FIGS. 4A and 4B provides a solution to that problem. The previous generator had recuperator 108 located on the left side or in the middle along the combustion chamber 106 before the emitter 110, as shown in FIG. 1. The new recuperator 240 is located on the right side after the emitter 230 and before the exhaust chamber in the new invention shown in FIGS. 4A and 4B.

Figure 5A:
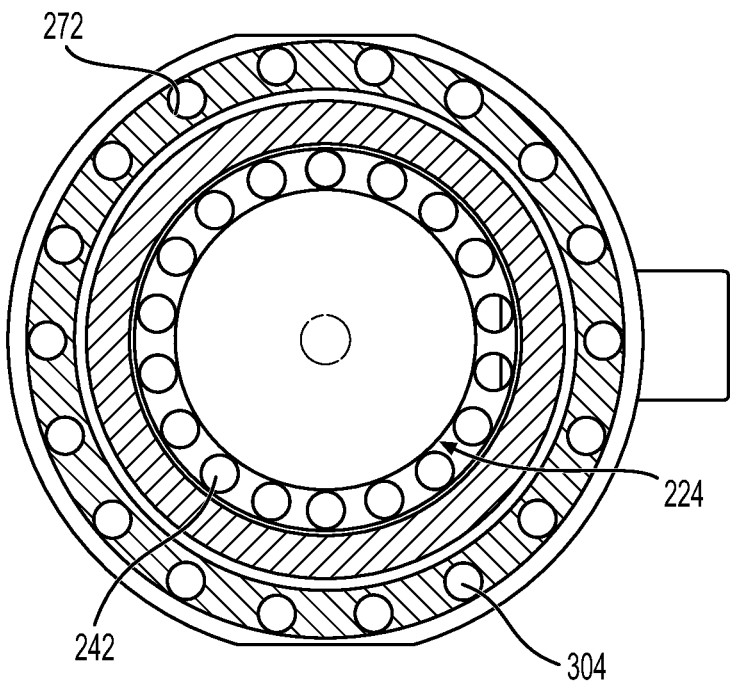
FIGS. 5A and 5B are sectional views of the novel BER.
Figure 5B:
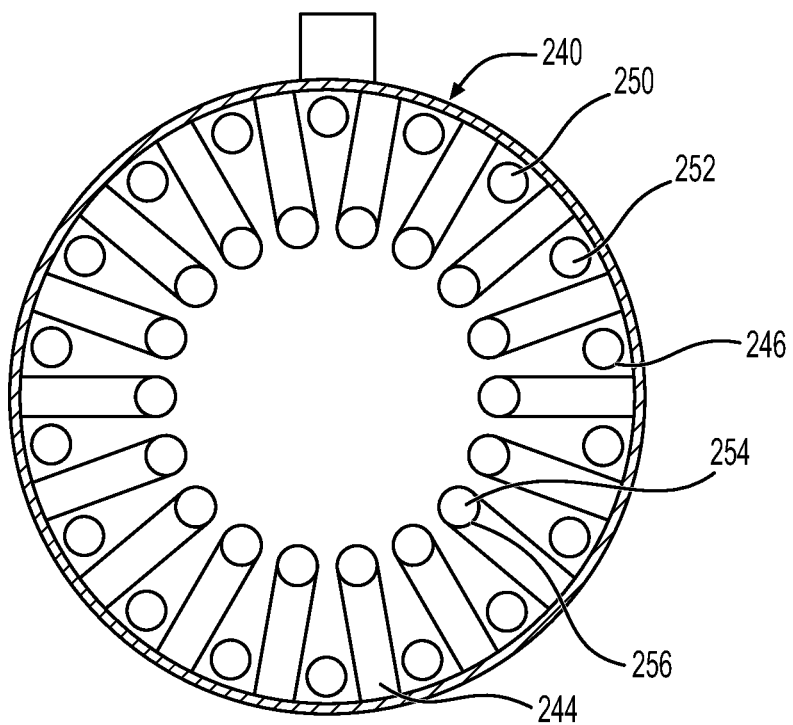

FIGS. 4A and 4B show a BER 200 construction for gas or liquid fuel such as JP8, as an example of the present invention. FIGS. 5A and 5B are sectional views of the novel BER.

Referring to FIG. 4B, the section B-B of the new BER 200 from FIG. 4A and also FIG. 5A, the section C-C from FIG. 4A, liquid fuel is fed at the fuel inlet 201 near the left side 202 into a vaporizing chamber 204 that initially is heated with a resistive heater 206. The fuel vapor 208 from chamber 204 is then mixed in mixing chamber 210 with preheated air 302 and ignited in the combustion zone 211 with igniter 214. Continued combustion 220 of the vaporized fuel 208 and the preheated air 302 heats the IR emitter 230. All combustion occurs and continues in the combustion chamber 220 with further combustion influenced by the conical catalytic pillar 224. Heat and light from the combustion and hot combustion gases radiantly and conductively heat the IR emitter 230. The IR filter 232 passes the most beneficial range of IR from the IR emitter 230 to photovoltaic cells in the PCAs that produce electricity. Hot combustion gases are directed toward the IR emitter 230 by the catalytic pillar 224, and the hot exhaust gases then pass through inner openings 242, as shown in FIG. 5A, to the Omega recuperator 240 shown in FIG. 5B. Omega elements 246 separate the hot exhaust gases in channels 244 from the remainder of the recuperator, through which flows the incoming air 250 that is being heated. Exhaust gases heat the Omega elements 246 that heat incoming air 250 from air inlets 252, as shown in cross-section D-D of FIG. 5B. The cooled exhaust gases 254 flow out of exhaust ports 256 to exhaust chamber 258 and exhaust 260, as shown in FIG. 4B.

Preheated air 302 fills the recuperator and flows from the recuperator through the outer ports 272, as shown in FIG. 5A, Section C-C into the space between the IR filter 232 and the silica glass window 262, as shown in FIG. 4B. From that space the preheated air flows into the mixing chamber 210 for mixing with the fuel vapor.

The heat flow is as follows. The hot exhaust enters the Omega recuperator 240, as shown in FIG. 4B. Section B-B from FIG. 4A is shown in FIG. 4B. Section C-C from FIG. 4A is shown in FIG. 5A, and Section D-D from FIG. 4A is shown in FIG. 5B. The hot exhaust enters the inner diameter hole set 242 as shown in section C-C also shown as hole set 256 in section D-D and heats the Omega elements 246 shown in section D-D, FIG. 5B. The exhaust 254 then exits at the right in section B-B, FIG. 4B. The walls of the Omega elements 246 heat the incoming combustion air 250 coming from the combustion air fan 300 shown in FIG. 8 and passing around the exhaust chamber 258 and into the recuperator 240 within the Omega elements 246. The preheated air from the recuperator 240 passes through the outer hole set 304 shown in section C-C in FIG. 5. The preheated air then flows out of the space between the outer silica window 262 and the inner IR filter-coated silica window 232. These silica tubes are coaxial with the inner cylindrical IR emitter 230. Since in equilibrium normal operation, these silica tubes are heated by the IR emitter 230, the preheated air remains hot and then enters the mixing chamber 210 and the combustion zone 220 at the left side as shown in section B-B, FIG. 4B.

The BER 200 in FIGS. 4A and 4B and 5A and 5B is novel and allows the use of liquid fuels.

Another difference between the BER 200 in FIG. 4 relative to the BER 100 in the prior patent as shown in FIG. 1 is that the combustion is now completely contained inside the IR emitter 230. In addition, the emitter 110 in FIG. 1 uses tilted emitter rods in order to create a uniform emitter temperature in the axial direction.

Figure 6A:
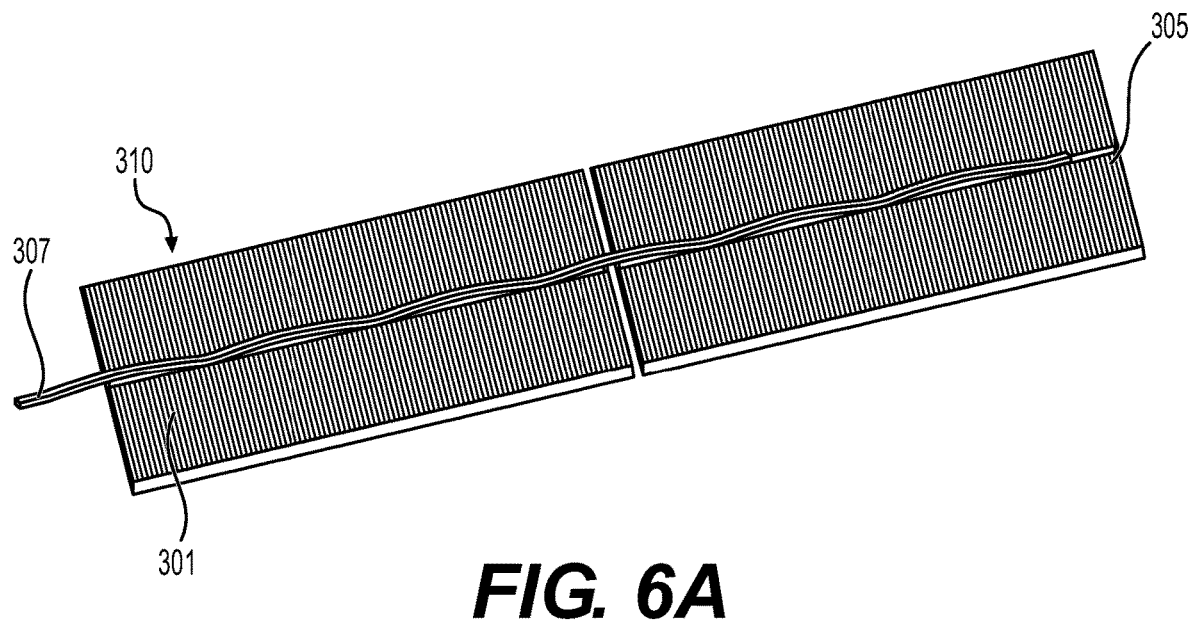
FIGS. 6A and 6B show two 15 mm long cells that have central bus bars with cell currents in parallel and a nine-facet circuit with four cells per facet for use with 60 mm tall emitter.

The present solution for the emitter temperature uniformity problem in this invention is shown in FIGS. 6A and B. The emitter may be hotter in the middle and cooler at either end. That emitter temperature non-uniformity problem can be accommodated in the photovoltaic converter array (PCA) wiring.

Figure 3A:
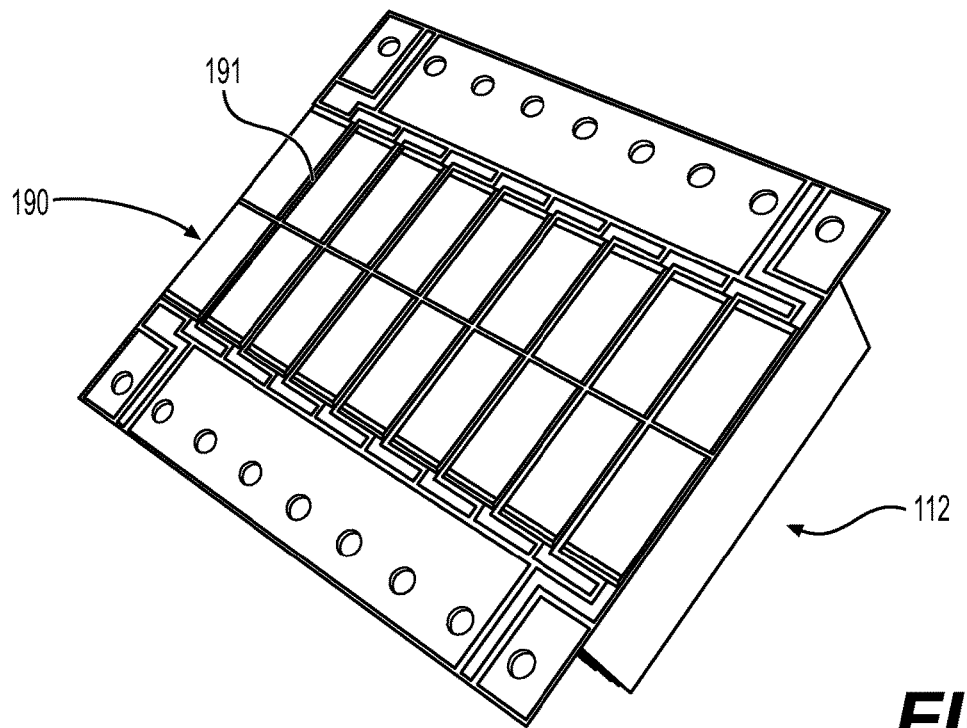
FIGS. 3A and 3B show a photovoltaic (PV) Converter Array in that 2013 patent.
Figure 3B:
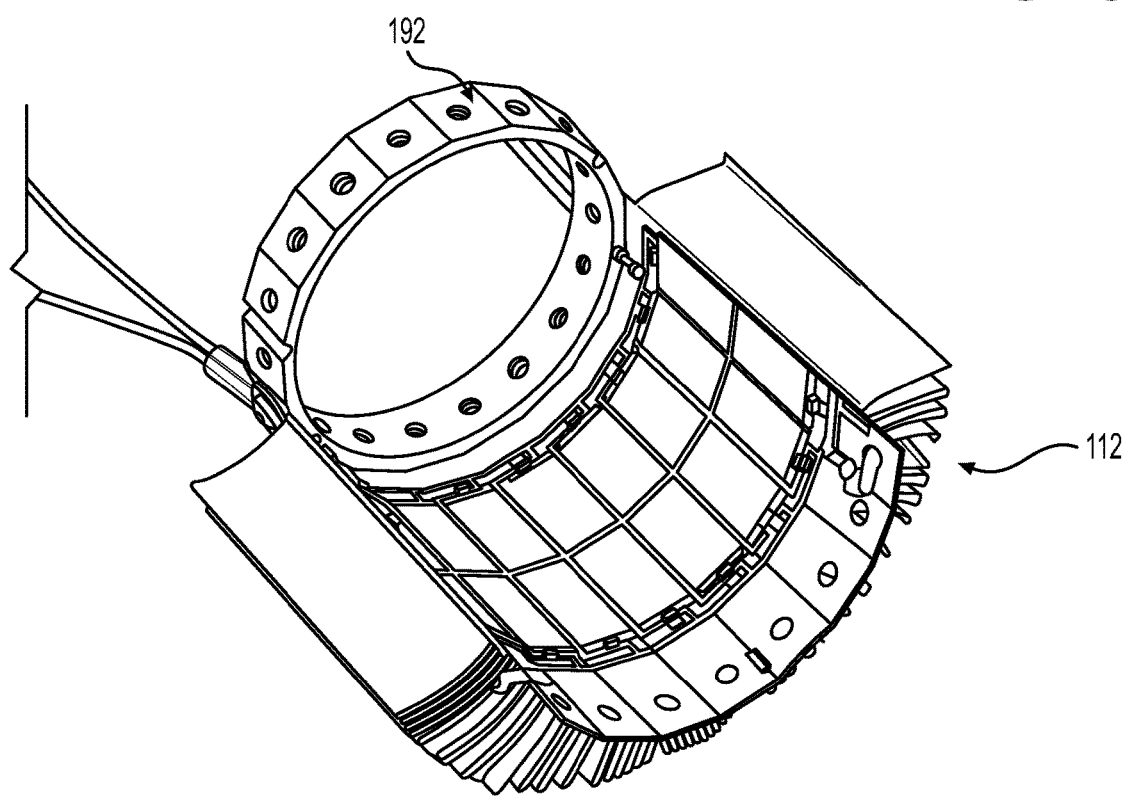

A thermal photovoltaic (TPV) unit per the 2013 patent has been built and described. The fabricated circuit for the photovoltaic converter assembly (PCA) 112 per the 2013 TPV patent is shown in FIGS. 3A and 3B. A PCA per the earlier patent may contain top and bottom rows of 18 series connected cells 191. There are actually two nine-facet circuits shown in flat 190 and folded 192 forms in FIGS. 3A and 3B.

There are potential but solvable problems with emitter height increase as in the present invention. The first problem lies in the emitter axial uniformity. Axial non uniformity can be acceptable when the TPV circuit uses two rows of cells with one row at top and the other row at the bottom. In that case, the circuit position can be adjusted along the emitter axis to balance the top and bottom row currents. The 30 mm tall emitter case has 18 cells per row, with the cell length along the emitter axis equal to 15 mm. The height of the two cell rows is 30 mm, equal to the emitter height.

A taller emitter is provided for the invention described herein. A 60 mm tall emitter is used as an example. For a 60 mm tall emitter, the cell lengths in each row can be just 30 mm. There are two problems with this. The first is that the cell current for 50 W and 12 V is 4.2 A. That is too large for a standard 3 micron thick cell grid and bus bar to handle without a very large series resistance and resistance loss. The second problem is that there is a thermal expansion mismatch between the cell and the copper circuit substrate. Long cells can break.

FIG. 6A shows the solution to these two problems. In FIG. 6A two 15 mm long cells 301 have central bus bars 305 with cell currents in parallel. A wire 307 stitched along the bus bars carries the current to the external circuit.

Figure 6B:
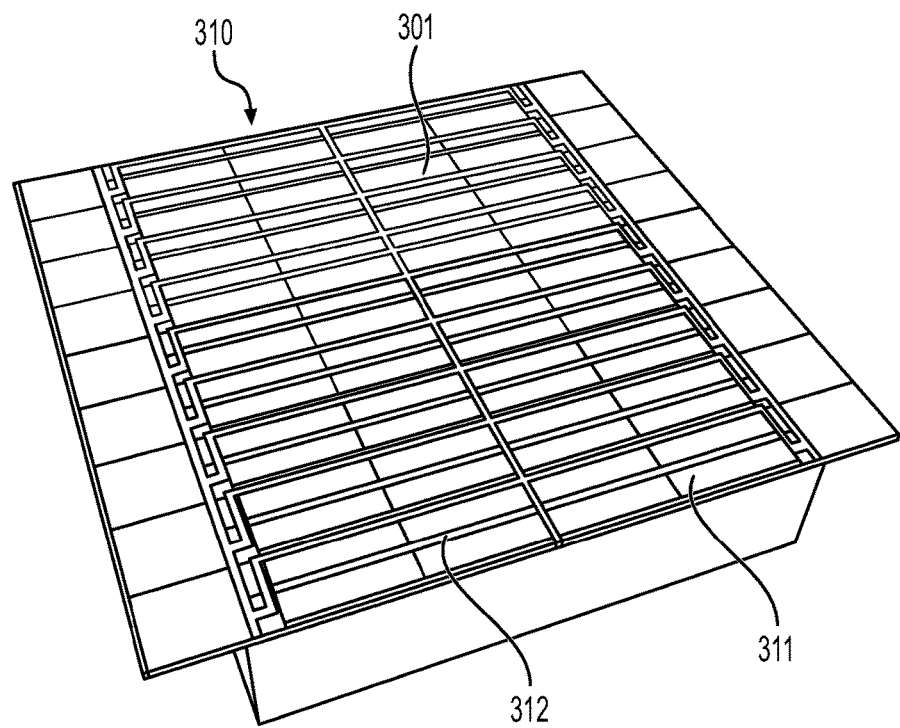
Figure 7A:
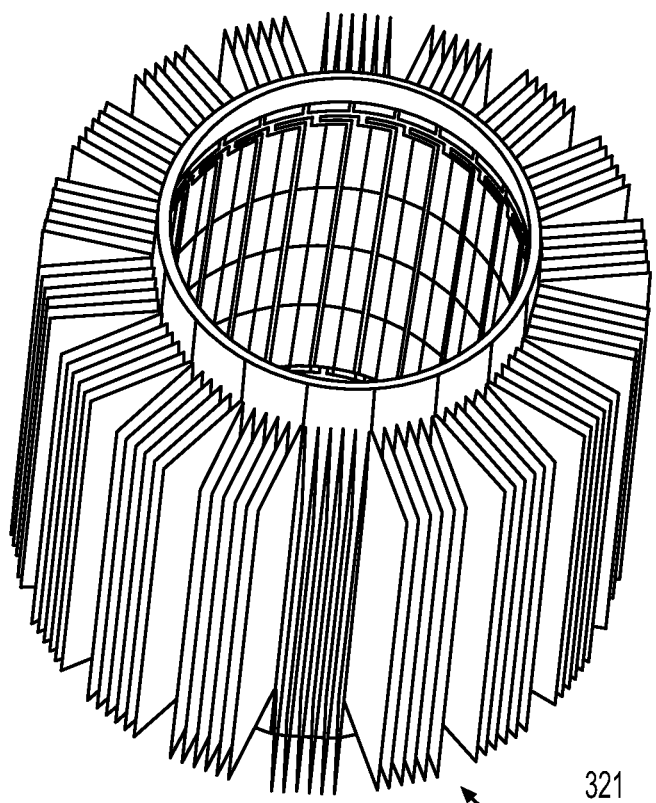
FIGS. 7A and 7B show photovoltaic converter arrays (PCAs) with two or three nine-facet circuits for 50 W or 100 W scale-up TPV power supplies.
Figure 7B:
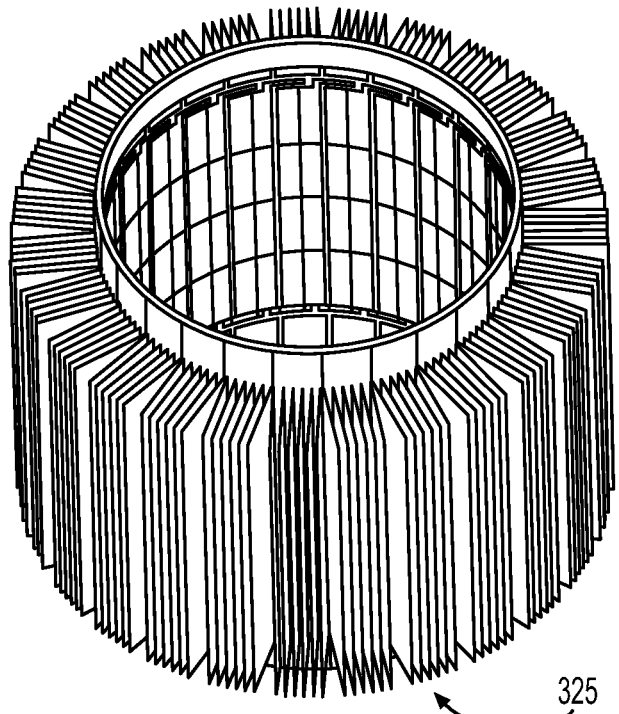

FIG. 6B shows a nine-facet circuit 310 with four cells 301 per facet for use with a 60 mm tall emitter. FIG. 6B shows a nine-facet circuit 310 with 4 cells per facet in top 311 and bottom 312 rows of cell pairs. The TPV cells used in this invention, for example, can be either GaSb cells or InGaAs/InP cells. Two of these nine-facet circuits can be combined in a 50 mm PCA for the 50 W scale-up TPV power supply 321 as shown in FIG. 7A. Three of these nine-facet circuits can be combined to make a 75 mm PCA as shown in FIG. 7B for a 100 W scale-up power supply 325. FIGS. 7A and 7B show PCAs with two 321 or three 325 nine-facet circuits for 50 W or 100 W scale-up TPV power supplies.

Figure 8:
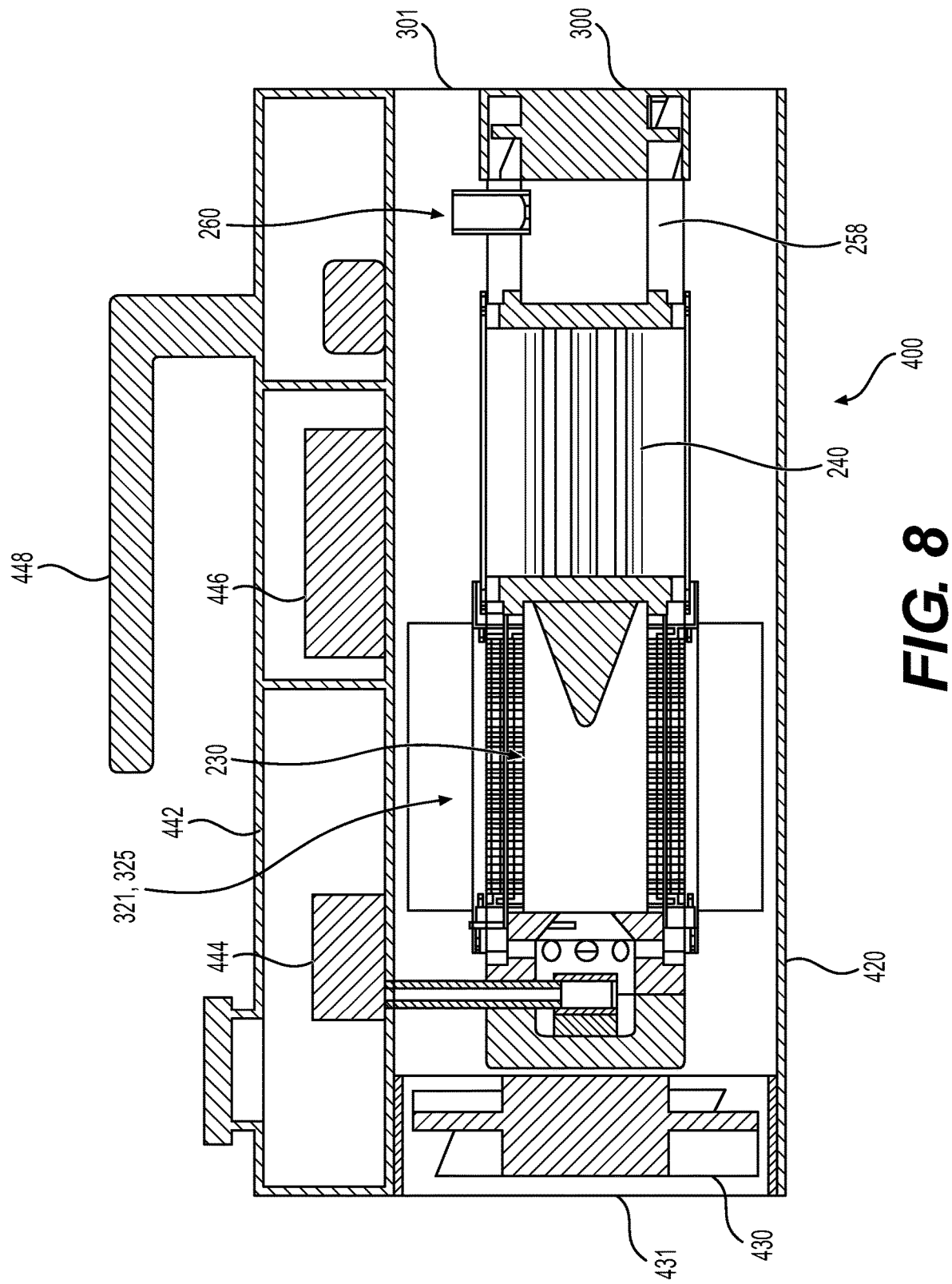
FIG. 8 shows a cross-sectional view of a liquid fuel fired TPV generator of the present invention incorporating an Omega recuperator.

The new Portable Liquid Hydrocarbon Fuel TPV Generator 400 overview is described with reference to the example in FIG. 8. FIG. 8 shows a cross section of a portable liquid fuel TPV generator 400 of the present invention. The BER 200 shown in FIGS. 4A and 4B is surrounded by the PCA 321 or 325 shown in FIG. 7A or 7B. The central elements are contained inside a housing 420. Combustion air fan 300 and cooling air fan 430 are at the ends of the BER. Unlike in the previous structure of FIG. 1, the combustion air fan is now on the right, the exhaust end 301, and the cooling air fan is now on the left end 431. The IR emitter 230 may be directly outside the combustion chamber. There are sections 440 on the top containing a fuel tank 442, a fuel pump 444, a start-up battery 446, a spark coil, and control electronics. The exhaust is near the exit of the cooling air to reduce the system exhaust temperature. A carrying handle 448 is shown at the top of the TPV generator in FIG. 8 simply to suggest the scale of this portable unit. The carrying handle is not an important part of this invention. FIG. 8 shows a liquid fuel fired TPV generator 400 incorporating an Omega recuperator 240. An advantage of this invention is that the BER 200 configuration with the Omega recuperator 240 now allows for TPV generator 400 operation with liquid fuels such as kerosene, JP8, etc.

While the invention has been described with reference to specific embodiments, modifications and variations of the invention may be constructed without departing from the scope of the invention, which is defined in the following claims.

I claim:

1. A portable fuel thermophotovoltaic (TPV) generator, further comprising:
    a liquid fuel inlet,
    a liquid fuel vaporizing chamber connected to the liquid fuel inlet,
    a liquid fuel heater connected to the liquid fuel vaporizing chamber,
    a heated air inlet,
    a mixing chamber connected to the liquid fuel vaporizing chamber and the heated air inlet,
    a combustion chamber connected to the mixing chamber,
    a continuing combustion chamber connected to the combustion chamber,
    a combustion product outlet connected to the continuing combustion chamber,
    a recuperator connected to the combustion product outlet,
    a combustion air supply connected to the recuperator and a heated air outlet from the recuperator connected to the heated air inlet,
    an exhaust chamber connected to the recuperator,
    an IR emitter surrounding the continuing combustion chamber,
    an IR filter spaced from and surrounding the IR emitter,
    a window spaced from and surrounding the IR filter,
    the heated air inlet further comprising a space between the IR filter and the window through which heated air passes to the heated air inlet, and
    a thermophotovoltaic array surrounding the window.

2. The apparatus of claim 1, further comprising an exhaust connected to the exhaust chamber.

3. The apparatus of claim 1, further comprising a combustion air fan configured for blowing combustion air across the exhaust chamber and into a combustion air side of the recuperator.

4. A portable fuel thermophotovoltaic (TPV) generator, further comprising:
    a fuel inlet,
    a heated air inlet,
    a mixing chamber connected to the fuel inlet and the heated air inlet,
    a combustion chamber connected to the fuel inlet and the heated air inlet,
    a continuing combustion chamber connected to the combustion chamber,
    a combustion product outlet connected to the continuing combustion chamber,
    a recuperator connected to the combustion product outlet,
    an air supply connected to the recuperator and a heated air outlet connected to the recuperator,
    an exhaust chamber connected to the recuperator,
    an IR emitter surrounding the continuing combustion chamber,
    an IR filter spaced from and surrounding the IR emitter,
    a window spaced from and surrounding the IR filter,
    the heated air inlet further comprising a space between the IR filter and the window through which the heated air passes to the heated air inlet, and
    a thermophotovoltaic array surrounding the window, further comprising a conic catalyst pillar mounted in the continuing combustion chamber near the recuperator and configured for directing IR toward the IR emitter and directing exhaust gas into an exhaust side of the recuperator.

5. The apparatus of claim 1, wherein the vaporizing chamber connected between the fuel inlet and the mixing chamber and the heater connected to the vaporizing chamber are configured for vaporizing kerosene or JP8 fuel, further comprising an ignition chamber connected between the mixing chamber and the combustion chamber and an igniter connected to the ignition chamber.

6. The apparatus of claim 1, wherein the recuperator is an omega recuperator having an omega element surrounding an open middle, wherein the open middle and insides of the omega element comprise the combustion air supply side of the omega recuperator, and wherein outsides of the omega element comprise an exhaust side.

7. The apparatus of claim 1, further comprising an annular photovoltaic cell array surrounding the window and configured for generating electric current from the IR passing through the window.

8. The apparatus of claim 7, further comprising heat transfer fins extending radially outward from the photovoltaic cell array.

9. The apparatus of claim 8, further comprising a housing surrounding the fins and the thermophotovoltaic generator and a cooling fan mounted in one end of the housing and configured for blowing cooling air through the fins and around the photovoltaic generator.

10. The apparatus of claim 9, further comprising a liquid hydrocarbon fuel tank mounted above the housing.

11. A method comprising providing a photovoltaic generator, further comprising:
blowing combustion air over an exhaust chamber and through a recuperator and through an annular space between a window and an IR filter into a mixing chamber,
cooling the annular space and heating the combustion air,
flowing a liquid hydrocarbon fuel into a vaporizing chamber,
heating the vaporizing chamber and flowing vaporized hydrocarbon fuel and the heated combustion air into the mixing chamber, and mixing the vaporized hydrocarbon fuel and the heated combustion air in the mixing chamber,
flowing the mixed vaporized liquid hydrocarbon fuel and the heated combustion air into an ignition chamber,
igniting the mixed vaporized liquid hydrocarbon fuel and heated combustion air in the ignition chamber, and igniting the mixed vaporized liquid hydrocarbon fuel and the heated combustion air,
flowing the ignited mixed vaporized liquid hydrocarbon fuel and the heated combustion air into a combustion chamber and producing heat therein,
heating and radiating the IR emitter surrounding a combustion chamber,
filtering IR and passing useful IR from the IR filter to a photovoltaic cell array surrounding the window, and
generating electricity with the photovoltaic array.

12. A portable fuel thermophotovoltaic (TPV) generator, further comprising:
a fuel inlet,
a heated air inlet,
a mixing chamber connected to the fuel inlet and the heated air inlet,
a combustion chamber connected to the fuel inlet and the heated air inlet,
a continuing combustion chamber connected to the combustion chamber,
a combustion product outlet connected to the continuing combustion chamber,
a recuperator connected to the combustion product outlet,
an air supply connected to the recuperator and a heated air outlet connected to the recuperator,
an exhaust chamber connected to the recuperator,
an IR emitter surrounding the continuing combustion chamber,
an IR filter spaced from and surrounding the IR emitter,
a window spaced from and surrounding the IR filter,
the heated air inlet further comprising a space between the IR filter and the window through which the heated air passes to the heated air inlet, and
a thermophotovoltaic array surrounding the window, further comprising passing the combusting hot air and fuel over a conic catalyst pillar and directing heat and radiation to the IR emitter from the pillar.

13. The method of claim 11, further comprising directing hot combustion product gas from the combustion chamber through the recuperator and the exhaust chamber and out through the exhaust.

14. The method of claim 11, further comprising separating the combustion air from the combustion product gas in an omega recuperator and separating the combustion air from the combustion product gas on opposite sides of an omega element in the omega recuperator.

15. The method of claim 11, further comprising blowing cooling air through heat conducting and radiating fins and across thermophotovoltaic cells in the array.

* * * * *